(12) United States Patent
Mashimo

(10) Patent No.: US 6,438,077 B1
(45) Date of Patent: Aug. 20, 2002

(54) OPTICAL DISK UNIT

(75) Inventor: Akira Mashimo, Tokorozawa (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/702,424

(22) Filed: Oct. 31, 2000

(30) Foreign Application Priority Data

Nov. 2, 1999 (JP) .......................................... 11-312756
Oct. 18, 2000 (JP) ...................................... 2000-318395

(51) Int. Cl.$^7$ ............................................... G11B 7/00
(52) U.S. Cl. ................. 369/44.28; 369/59.11; 369/47.5; 369/53.1
(58) Field of Search ............................ 369/44.11, 44.26, 369/44.27, 44.28, 44.29, 44.32, 44.34, 44.35, 47.1, 47.14, 47.45, 53.1, 53.11, 53.12, 53.13, 53.14, 53.19, 53.23, 53.42, 275.1, 275.4, 47.5, 116

(56) References Cited

U.S. PATENT DOCUMENTS

| 4,787,076 A | 11/1988 | Deguchi et al. |
| 5,544,136 A | * 8/1996 | Horie ........................ 369/44.34 |
| 5,708,636 A | 1/1998 | Takahashi et al. |
| 5,933,410 A | * 8/1999 | Nakane et al. ........... 369/275.3 |

FOREIGN PATENT DOCUMENTS

| JP | 03187021 A | 8/1991 |
| JP | 11-232649 | 8/1999 |

* cited by examiner

Primary Examiner—Muhammad Edun
(74) Attorney, Agent, or Firm—Anderson Kill & Olick; Eugene Lieberstein; Michael N. Meller

(57) ABSTRACT

An optical disk unit that directs a light beam onto a pre-groove on an optical disk and generates a tracking error signal for tracking control based on a detection signal generated from a reflection of the light beam, the optical disk unit including a recording offset generator that acquires a differential between a tracking error component generated from a detection signal from the reflection of the light beam at a write power level and a tracking error component generated from a detection signal from the reflection of the light beam at a read power level and adds the differential to the tracking error signal at recording.

9 Claims, 15 Drawing Sheets

OPTICAL DISK UNIT

BACKGROUND OF THE INVENTION

1. Field of the Invention

The present invention relates generally to an optical disk unit, and more particularly, to an optical disk unit capable of recording information to and/or reproducing information from an optical disk recording medium.

2. Description of the Related Art

Recordable optical disks are of two general types, the so-called Write Once and the Erasable. The former includes the so-called Compact Disk Recordable, or CD-R, and the Compact Disk Rewritable, or CD-RW. The CD-R and the CD-RW are provided with a guide, that is, a pregroove. The pregroove undulates slightly in the radial direction of the disk around a central wavelength of 22.05 kHz, and address information called ATIP (Absolute Time In Pregroove) is FSK modulated, stacked and recorded at a maximum displacement of ±1 kHz.

The tracking and focus servo circuits of the optical disk units that record and reproduce information to and from the recordable optical disks described above project light onto the optical disk and detect light reflected back from the optical disk using a plurality of photosensors, generate a tracking error signal using a predetermined set of calculations, and drive a tracking actuator based thereon.

The optical disk units record and reproduce information to and from a CD-R by using the light beam for the read power during reproduction and alternating the light beam between a write power and a read power (the write power being greater than the read power) corresponding to recording signal values 0 and 1. For this reason, during reproduction as a matter of course but also during recording as well, sampling the timing of the reflected light generates a tracking error signal. It should be noted that the write power is greater than the read power.

With the optical disk units that record and reproduce information to and from erasable CD-RW type disks, the light beam power is alternated between a write power and an erase power, (the write power being stronger than the erase power which is stronger than the read power) corresponding to the recording signal values 0, 1.

As a result, the light reflected back from the disk (the light beam power being at read power) is detected and a tracking error signal (if any) is generated. During recording, the light beam power, which is at erase power, is sample held and a tracking error signal generated.

The differential push-pull method is one common tracking control means.

FIG. 1 is a schematic diagram showing three light beam spots used in the differential push-pull tracking method.

The differential push-pull method involves projecting a main light beam spot 2 onto the track n formed by the pregrooves 1 as shown in FIG. 1, and, at the same time, offsetting a leading sub beam spot 3 and a trailing sub beam spot 4 from the track n by a predetermined distance in a direction of a width of the pregroove 1. A reflection of the main light beam spot 2 is detected by photosensors 10A, 10B separated along the width direction of the pregroove 1 as shown in FIG. 2, a reflection of the leading sub beam spot 3 is detected by photosensors 12A, 12B separated along the width direction of the pregroove 1, and a reflection of the trailing sub beam spot 14A, 14B is detected by photosensors 14A, 14B separated along the width direction of the pregroove. It should be noted that in FIG. 1 the light beam spots 2, 3 and 4 are given reference letters A, B which corresponds to the portions detected by the photosensors 10A, 10B, 12A, 12B, 14A, 14B.

FIG. 2 is a diagram showing the circuit structure of one example of a conventional tracking error detection circuit using the differential push-pull method. In FIG. 2, the detection signals of the photosensors 10A, 10B are supplied via a sample-and-hold circuit 16 to a noninverted input pin and an inverted input pin of a subtracting circuit 18, with a differential signal output by the subtracting circuit 18 being supplied to a noninverted input pin of another subtracting circuit 20.

It should be noted that the sample-and-hold circuit 16 samples the respective detection signals of the photosensors 10A, 10B, 12A, 12B, 14A, 14B at read power and holds at write power.

The respective detection signals of photosensors 12A, 12B are supplied via the sample-and-hold circuit 16 to one of the input pins of adding circuits 22, 24, and the respective detection signals of photosensors 14A, 14B are supplied to the other input pins of the adding circuits 22, 24. The adding circuit 22 adds the two signals supplied and supplies the sum to a noninverted input pin of a subtracting circuit 26, and the adding circuit 24 adds the two signals supplied and supplies the sum to the inverted input pin of the subtracting circuit 26. In order to carry out the differential push-pull tracking method, the differential signal output from the subtracting circuit 26 is amplified by an amplifier 28 to for example a gain 7 and then supplied to an inverted input pin of the subtracting circuit 20.

The error signal output by the subtracting circuit 20 is supplied to the adder 30 and either a reproduction offset or a recording offset supplied from the switch 32 is added and the sum output from the pin 34 as a tracking error signal. By controlling the tracking so that the tracking error signal becomes zero, the main light beam spot 2 follows the pregroove 1, that is, tracking is carried out.

However, the laser beam emitted from the laser diode is stronger or weaker depending on whether it is set to read power or write power, and the axis of the laser beam can be displaced as a result.

FIG. 3 is a diagram for explaining a displacement of an axis of a laser beam emitted from a laser diode. As shown in FIG. 3, the laser beam emitted from the laser diode 36 at read power is shown as a straight line, with the laser beam emitted from the laser diode 36 at write power shown as a dotted line, resulting in a displacement of the axis of the beam by an angle θ. When the direction of displacement of the beam axis is in the direction of the width of the pregroove 1, then during recording as well a tracking error signal is generated at read power level and so the recording region recorded at write power (pits in the case of a CD-R) slips away from the pregroove 1. As a result, a switch 32 for correcting this displacement is provided, in order to switch between replay offset and recording offset.

Conventionally, the process of producing a disk unit involves actually recording signals on an optical disk, and reproducing that recorded portion so as to detect and maintain a tracking error signal offset portion. However, a difficulty arises in that the recording offset detected at the manufacturing stage is used and remains fixed thereat, whereas changes in temperature and the passage of time result in changes in the characteristics of the laser diode 36 and a consequent change in the amount of offset of the beam axis at recording with respect to that at reproduction. Hence, a tracking error arises and accurate tracking cannot be conducted.

SUMMARY OF THE INVENTION

Accordingly, it is an object of the present invention to provide an improved and useful optical disk unit in which the above-described disadvantage is eliminated.

A further and more specific object of the present invention is to provide an improved and useful optical disk unit in which tracking error can be avoided and correct tracking carried out even if the amount of displacement of the light beam of the laser diode during recording changes.

The above-described objects of the present invention are achieved by an optical disk unit that directs a light beam onto a pregroove on an optical disk and generates a tracking error signal for tracking control based on a detection signal generated from a reflection of the light beam, the optical disk unit comprising a recording offset generator that acquires a differential between a tracking error component generated from a detection signal from the reflection of the light beam at a write power level and a tracking error component generated from a detection signal from the reflection of the light beam at a read power level, and adds the differential to the tracking error signal at recording.

According to this aspect of the invention, a recording offset is detected each time recording is performed, so tracking error can be avoided and correct tracking carried out even if the amount of displacement of the light beam of the laser diode during recording changes.

The above-described objects of the present invention are also achieved by an optical disk unit that directs a main recording and reproduction light beam onto a pregroove of an optical disk and a directs a tracking sub light beam displaced in a direction of a width of the pregroove, and generates a tracking error signal based on a detection signal generated from a reflection of the light beam for tracking purposes, the optical disk unit comprising a recording offset generator that acquires a differential between a tracking error component generated from a detection signal from the reflection of the sub light beam at a write power level and a tracking error component generated from a detection signal from the reflection of the sub light beam at a read power level and adds the differential to the tracking error signal at recording.

According to this aspect of the invention, a recording offset is detected each time recording is performed, so tracking error can be avoided and correct tracking carried out even if the amount of displacement of the light beam of the laser diode during recording changes.

Other objects, features and advantages of the present invention will become apparent from the following detailed description when read in conjunction with the accompanying drawings.

DETAILED DESCRIPTION OF THE INVENTION

A detailed description will now be given of an optical disk unit according to an embodiment of the present invention, with reference to the accompanying drawings. It should be noted that identical or corresponding elements are given identical or corresponding reference numbers in all drawings, with detailed descriptions thereof given once and thereafter omitted.

Figure 1:
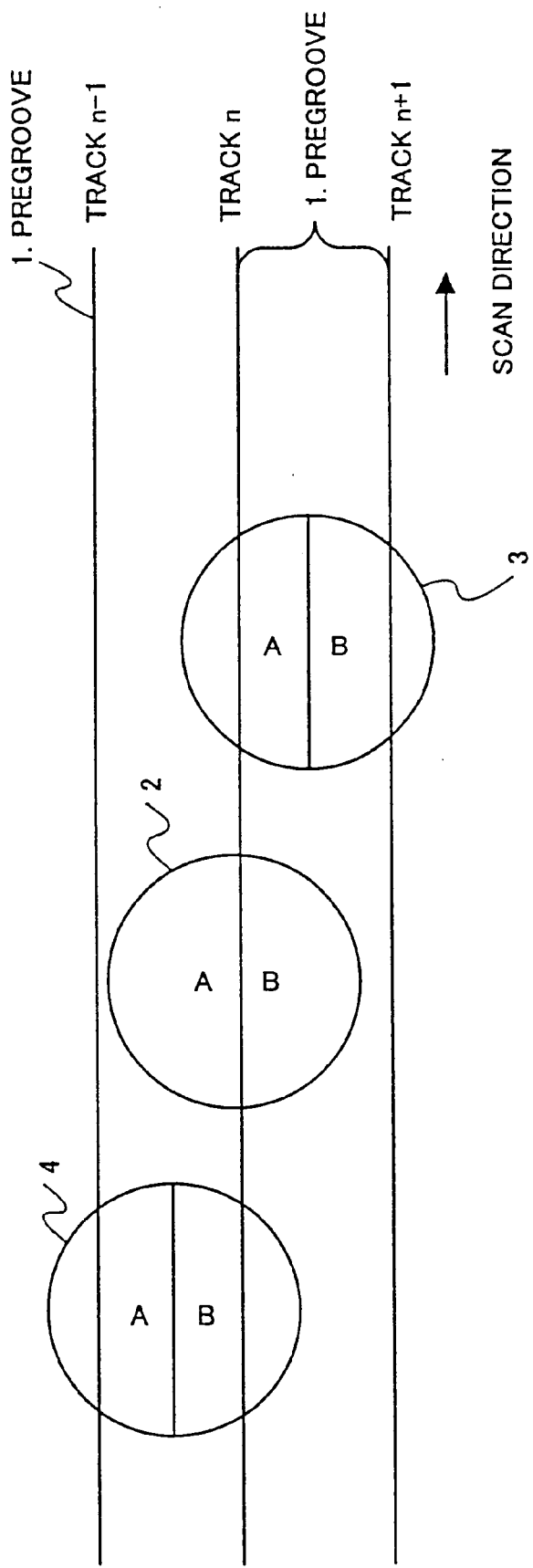
FIG. 1 is a schematic diagram showing three light beam spots used in the differential push-pull tracking method.
Figure 2:
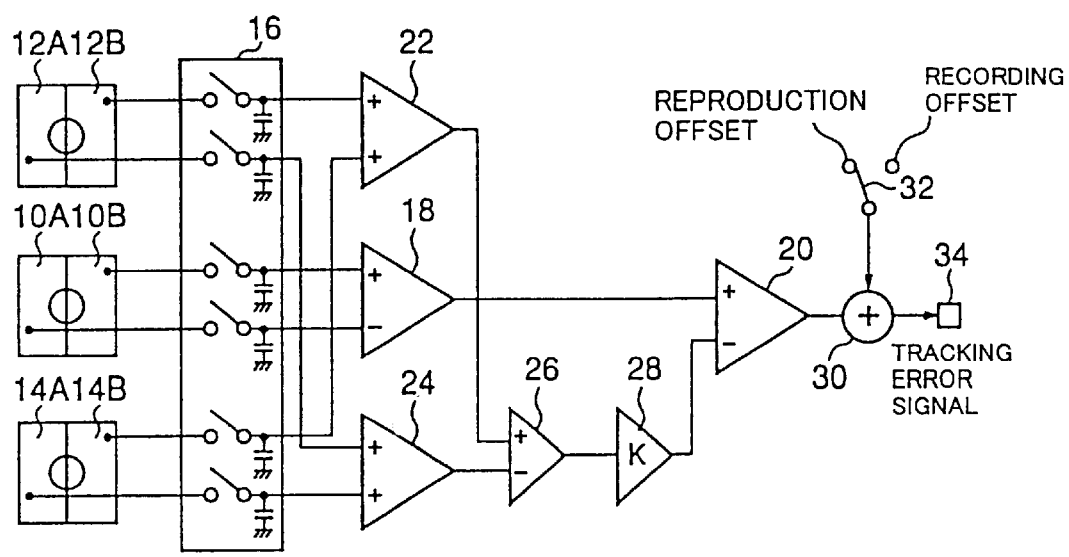
FIG. 2 is a circuit structure diagram of a conventional tracking error detection circuit used in the differential push-pull tracking method.
Figure 3:
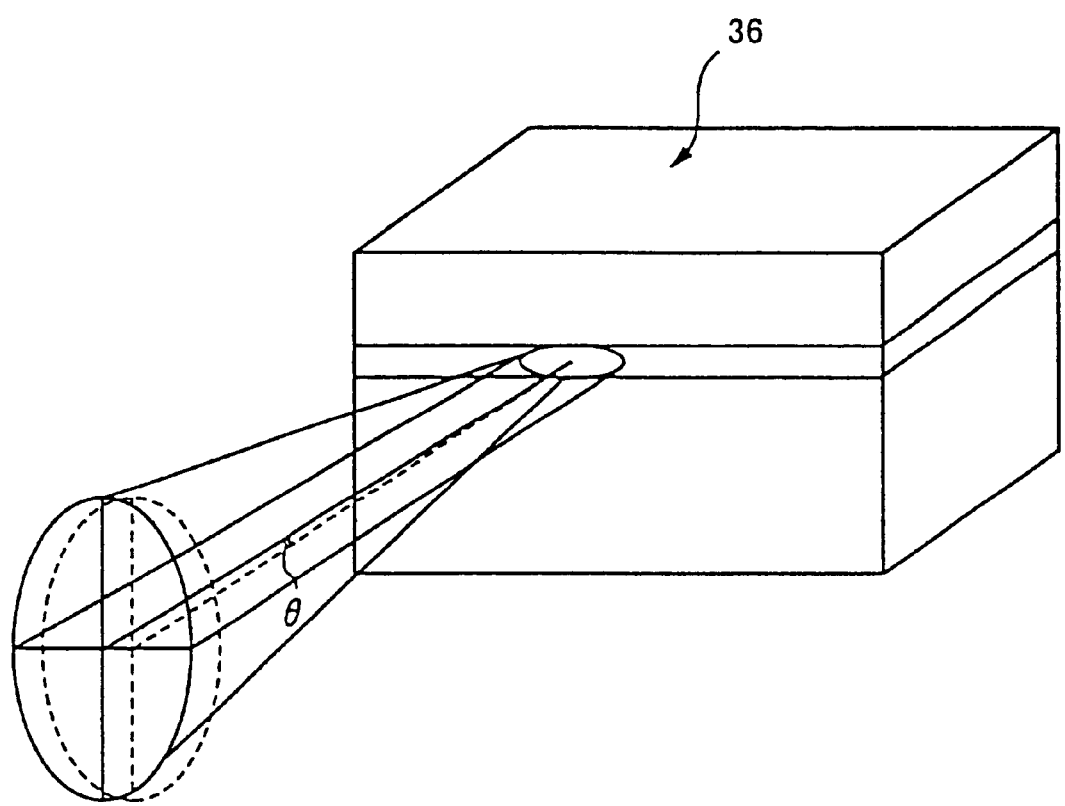
FIG. 3 is a diagram for explaining a displacement of an axis of a laser beam emitted from a laser diode.
Figure 4:
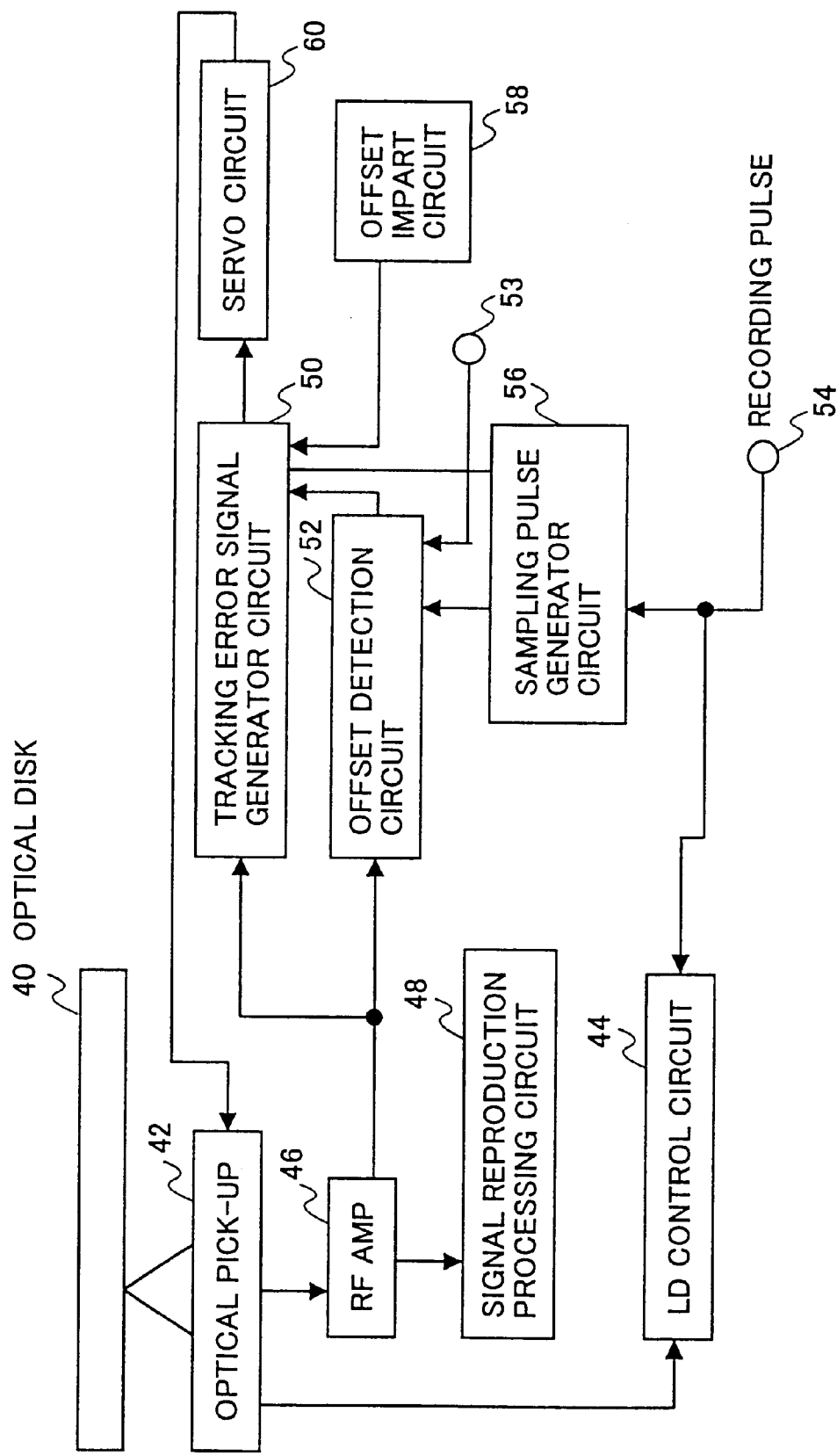
FIG. 4 is a block diagram of an optical disk unit according to one embodiment of the present invention.

FIG. 4 is a block diagram of an optical disk unit according to one embodiment of the present invention. As shown in the diagram, a recordable optical disk 40 such as a CD-R or CD-RW is rotatably driven at a predetermined speed of rotation by a spindle motor not shown in the diagram. An optical pick-up 42 is driven by a thread motor not shown in the diagram in a direction of a radius of the optical disk 40. The optical pick-up 42 comprises an objective lens, an actuator, a 2/4 wavelength plate, a collimator lens, a beam splitter, a laser diode, a front monitor, and a photosensor.

A laser diode control circuit 44 triggers the laser diode in the optical pick-up 42 so as to output a laser beam at a read power level, that is, a read power, during reproduction, and a write power, erase power and a read power based a recording pulse during recording.

Additionally, the laser diode control circuit 44 controls a laser driver so as to maintain the laser beam at optimum power based on an intensity of the laser beam detected at the front monitor within the optical pick-up 42.

An RF amplifier 46 is a head amplifier that amplifies the reproduction signal reproduced from the optical disk from the photosensor within the optical pick-up 42. The reproduction signal amplified by the RF amplifier 46 is supplied to a signal reproduction processing circuit 48 and, at the same time, is supplied to a tracking error signal generation circuit 50 and an offset detection circuit 52.

The signal reproduction processing circuit 48 processes the supplied signal using CIRC (Cross Interleaved Read-Solomon Code) decode, EFM (Eight to Fourteen Modulation), synchronized detection, and further, an ECC (Error Correct Code) decode special to CD-ROM, and supplies the processed signal to a later-stage circuit.

Figure 5:
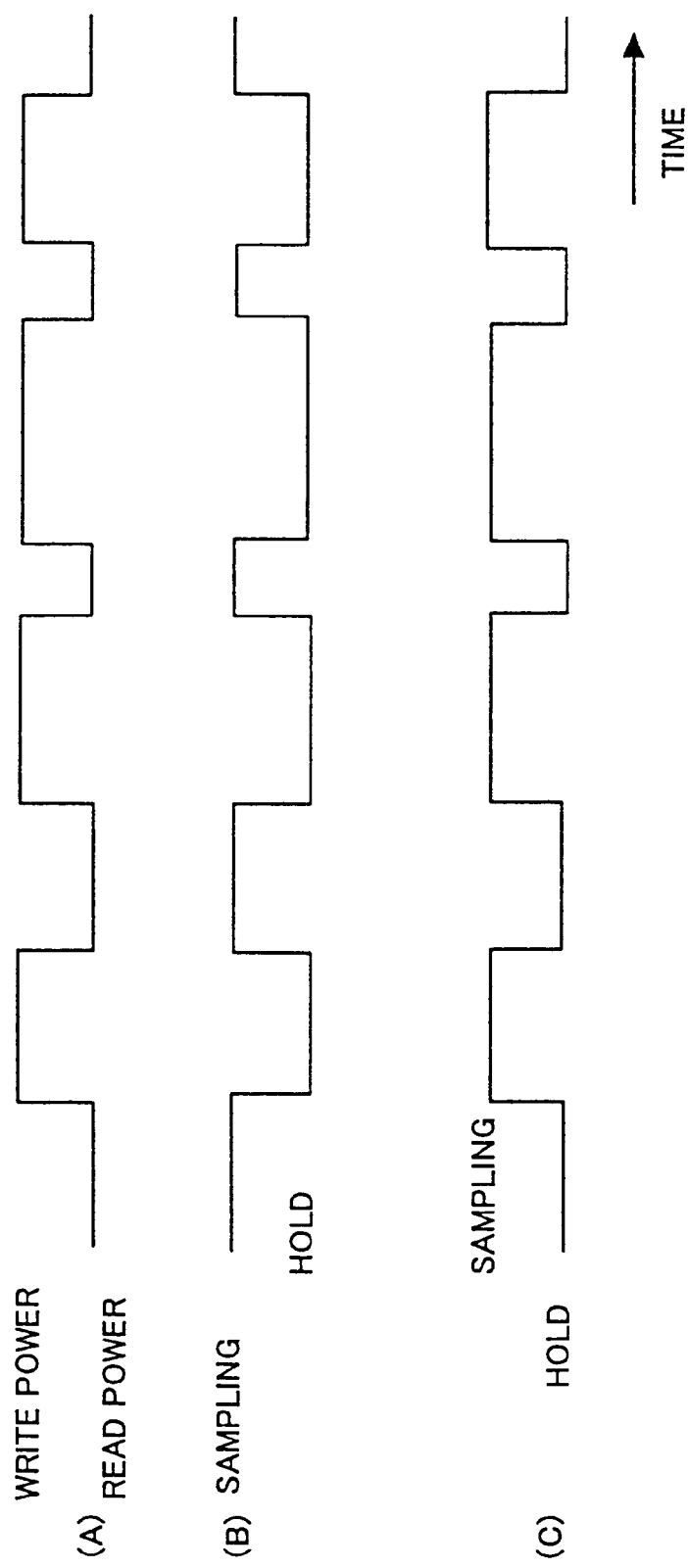
FIG. 5 is a recording pulse and sampling pulse signal timing chart of the present invention.

FIG. 5 is a recording pulse and sampling pulse signal timing chart of the present invention. A recording pulse from a pin 54 is supplied to a laser diode control circuit 44 and at the same time is supplied to a sampling pulse generator circuit 56. Based on the recording pulse shown as (A) in FIG. 5, the sampling pulse generator circuit 56 generates two types of sampling pulses shown as (B) and (C) in FIG. 5 and supplies these pulses to a tracking error signal generation circuit 50 and an offset detection circuit 52.

The offset detection circuit 52 detects an offset at recording (hereinafter a recording offset) and, when a control signal supplied from the pin 53 indicates recording, the detected recording offset is supplied to the tracking error signal generation circuit 50. An offset at reproduction (hereinafter a reproduction offset) is already held in the offset supply circuit 58, and this reproduction offset is supplied to the tracking error signal generation circuit 50. The reproduction offset is automatically adjusted to eliminate offset when an optical disk 40 is loaded in the optical disk unit and the optical disk unit begins to reproduce information recorded on the optical disk.

The tracking error signal generation circuit 50 samples or holds the detection signal from the photosensors according to the sampling pulse from the sampling pulse generator circuit 56, adds the reproduction offset from the offset supply circuit 58 and the recording offset from the offset detection circuit 52 and generates a tracking error signal. This tracking error signal is then supplied to a servo circuit 60. The servo circuit 60 then drives an actuator inside the optical pick-up 42 to perform tracking control.

Figure 6:
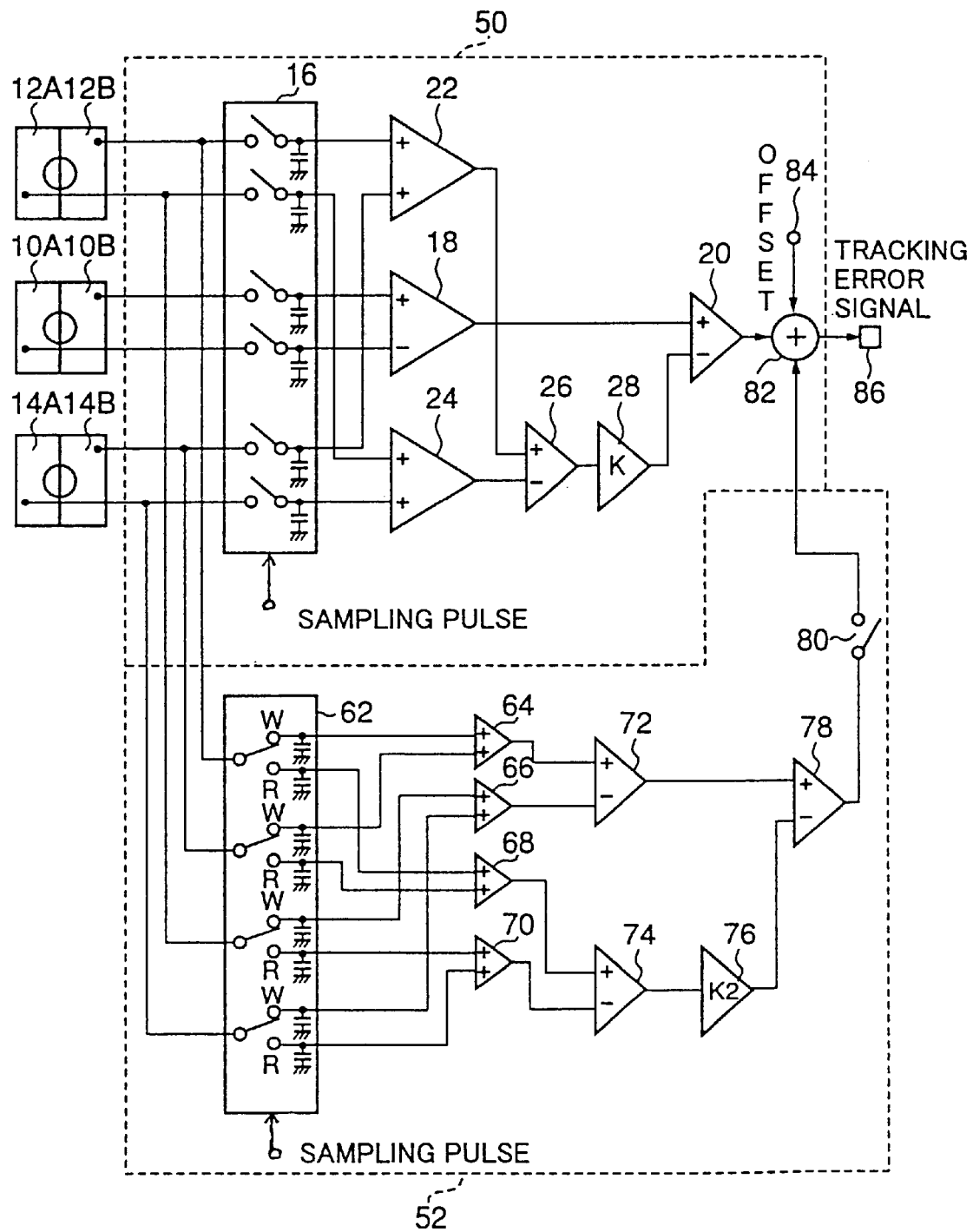
FIG. 6 is a circuit diagram of a tracking error signal generation circuit and an offset detection circuit of an optical disk unit according to a first embodiment of the present invention.

FIG. 6 is a circuit diagram of a tracking error signal generation circuit and an offset detection circuit of an optical disk unit according to a first embodiment of the present invention.

As shown in FIG. 6, respective detection signals from the photosensors 10A and 10B are supplied to a noninverted input pin and an inverted input pin of the subtracting circuit 18 after passing through the sample-and-hold circuit 16, with the differential signal output from the subtracting circuit 18 being supplied to a noninverted input pin of the subtracting circuit 20. It should be noted that in FIG. 6 there is no RF amplifier as described above. The sample-and-hold circuit 16 is supplied with a sampling pulse shown as (B) in FIG. 5 and accordingly samples the detection signals of the photosensors 10A, 10B, 12A, 12B, 14A and 14B at read power, and holds the at write power.

The detection signals of the photosensors 12A and 12B, respectively, pass through the sample-and-hold circuit 16 and are supplied to one of the input pins of the adding circuits 22, 24, with the detection signals of the photosensors 14A and 14B. respectively, being passed through the sample-and-hold circuit 16 and supplied to the other of the input pins of the adding circuits 22, 24. The adding circuit 22 adds the two signals supplied thereto and supplies the sum to the non-inverted input pin of the subtracting circuit 26. The adding circuit 24 adds the two signals supplied thereto and supplies the sum to the inverted input pin of the subtracting circuit 26. In order to carry out the differential push-pull tracking method, the differential signal output from the subtracting circuit 26 is amplified by an amplifier 28 to for example a gain 7 and then supplied to an inverted input pin of the subtracting circuit 20. The error signal output from the subtracting circuit 20 is supplied to an adder 82.

The respective detection signals of the photosensors 12A, 12B, 14A and 14B that detect reflections of the sub beam spots 3, 4 are supplied to a sample-and-hold circuit 62 that forms the offset detection circuit 52. Supplying only the detection signals generated from the reflections of the sub beam spots 3, 4 to the offset detection circuit 52 means that, in contrast to a variation in an intensity of light reflected from the disk according to the form of the recorded region (a pit in the case of a CD-R) at the main light beam spot 2 directed onto the disk at write power during recording, the intensity of light reflected from the disk at the regions of the sub beam spots 3, 4 (where no recording regions are formed) does not vary but remains constant.

The sample-and-hold circuit 62 is supplied with the sampling pulse (C) shown in FIG. 5, with sampling at write power and hold at read power, and supplied from a W pin to adding circuits 64, 66, and at the same time the sample-and-hold circuit 62 is supplied with the sampling pulse (B) shown in FIG. 5, with sampling at read power and hold at write power, and supplied from an R pin to the adding circuits 68, 70.

As a result, the adding circuit 64 adds the detection signals of the photosensors 12B and 14B at write power and supplies a signal to the non-inverted input pin of a subtracting circuit 72, and the adding circuit 66 adds the detection signals of the photosensors 12A and 14A at write power and supplies a signal to the inverted input pin of the subtracting circuit 72. Additionally, the adding circuit 68 adds the detection signals of the photosensors 12B and 14B at read power and supplies a signal to a noninverted input pin of a subtracting circuit 74, and the adding circuit 70 adds detection signals of photosensors 12A and 14A at read power and supplies a signal to a non-inverted input pin of the subtracting circuit 74.

Accordingly, the subtracting circuit 72 outputs a tracking error component obtained from the light reflected from the sub beam spots 3, 4 at write power, and outputs a tracking error component obtained from the light reflected from the light beam spots 3, 4. The subtracting circuit 72 output is supplied to the inverted input pin of the subtracting circuit 78, the subtracting circuit 74 output is gain-adjusted by the amplifier 76 in order to match the read power and the write power and then supplied to the inverted input pin of the subtracting circuit 78, and the subtracting circuit 78 generates an amount by which the normalized write power and read power tracking error components differ, that is, a recording offset, and supplies that recording offset to the switch 80. It should be noted that the subtracting circuit 72 output may be gain-adjusted instead of the subtracting circuit output 74.

According to the control signal, the switch 80 is turned ON only during recording and supplies the recording offset to the adder 82. During reproduction, the adder 82 then adds the reproduction offset from a pin 84 to the error signal output by the adding circuit 20, and during recording, the adder 82 further adds the recording offset from the switch 80, and outputs the sum as a tracking error signal from a pin 86. By adjusting the tracking control at the servo circuit 60 so that the tracking error signal approaches zero, the main beam spot 2 can track the pregroove 1.

In this fashion, each time recording is carried out a recording offset is sought, so that an accurate recording offset can be obtained even if changes in the laser diode characteristics due to temperature changes or the passage of time cause the amount by which the light beam axis is displaced during recording to shift with respect to that axis during reproduction. As a result, tracking error can be prevented and accurate tracking can be conducted.

Figure 7:
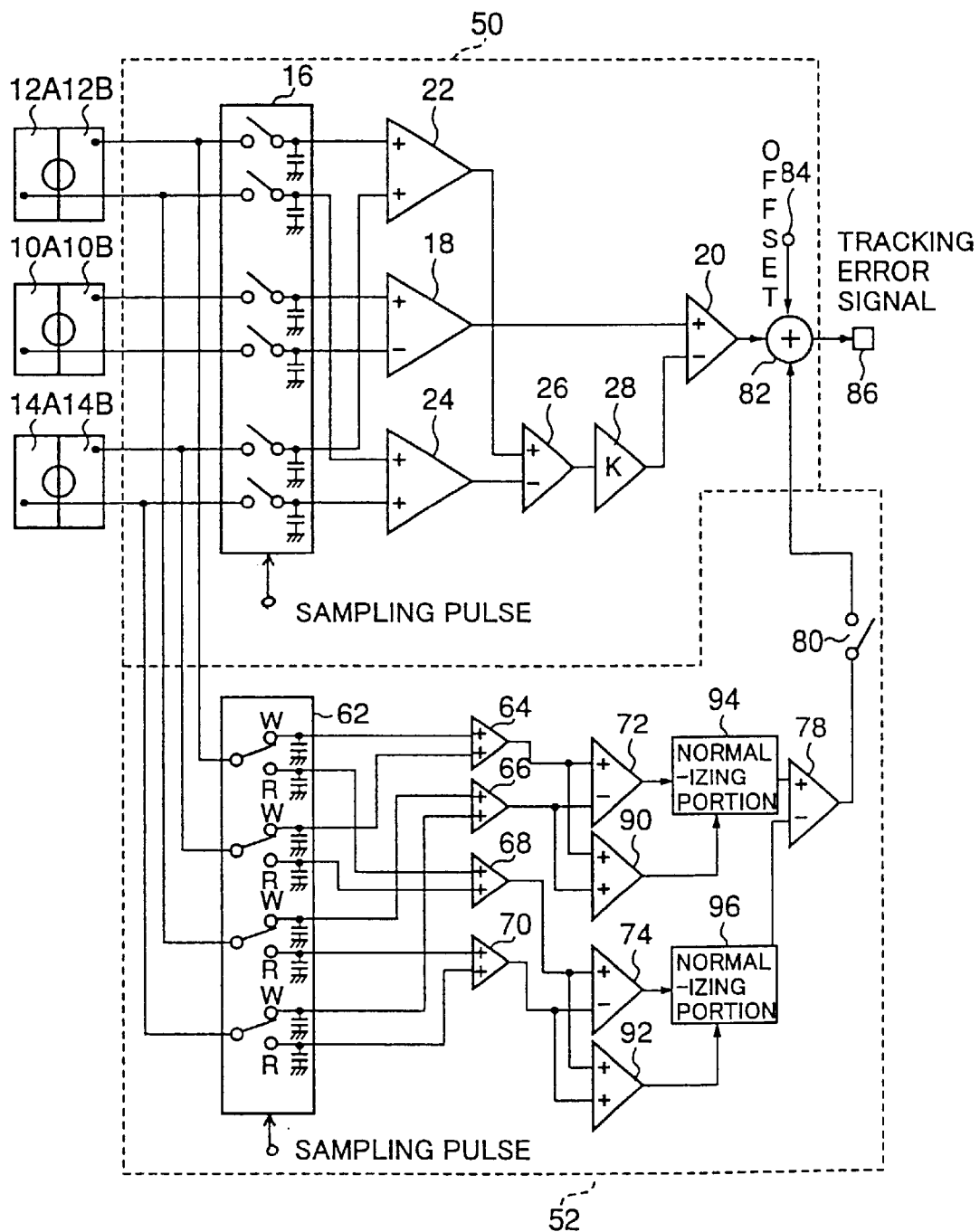
FIG. 7 is a circuit diagram of a tracking error signal generation circuit and an offset detection circuit of an optical disk unit according to a second embodiment of the present invention.

FIG. 7 is a circuit diagram of a tracking error signal generation circuit 50 and an offset detection circuit 52 of an optical disk unit according to a second embodiment of the present invention.

In FIG. 7, the respective detection signals of the photosensors 10A, 10B are supplied to the noninverted and the inverted input pins of the subtracting circuit 18 via the sample-and-hold circuit 16, with the differential signal output from the subtracting circuit 18 being supplied to the non-inverted input pin of the subtracting circuit 20. It should be noted that there is no RF amplifier 46 shown in FIG. 7. The sample-and-hold circuit 16 is supplied with the sampling pulse shown as (B) in FIG. 5, such that the respective detection signals of the photosensors 10A, 10B, 12A, 12B, 14A, 14B are sampled at read power and held at write power.

The respective detection signals of the photosensors 12A, 12B pass through the sample-and-hold circuit 16 and are supplied to the input pin of one of the adding circuits 22, 24, and the respective detection signals of the photosensors 14A, 14B pass through the sample-and-hold circuit 16 and are supplied to the input pin of the other of the adding circuits 22, 24. The adding circuit 22 adds the two supplied signals and supplies the sum to the noninverted input pin of the subtracting circuit 26, and the adding circuit 24 adds the two supplied signals and supplies the sum to the inverted input pin of the subtracting circuit 26. In order to carry out the differential push-pull method of tracking, the differential signal output from the subtracting circuit 26 is amplified by an amplifier 28 to for example a gain 7 and then supplied to an inverted input pin of the subtracting circuit 20. The error signal output from the subtracting circuit 20 is supplied to the adder 82.

The respective detection signals of the photosensors 12A, 12B, 14A and 14B that detect the reflection of the sub beam spots 3, 4 are supplied to the sample-and-hold circuit 62 which comprises the offset detection circuit. Supplying only the detection signals generated from the reflections of the sub beam spots 3, 4 to the offset detection circuit 52 means that, in contrast to the variation in the intensity of light reflected from the disk according to the form of the recorded region (pits in the case of a CD-R) at the main light beam spot 2 directed onto the disk at write power during recording, the intensity of light reflected from the disk at the regions of the sub beam spots 3, 4 (where no recording regions are formed) does not vary but remains constant.

The sample-and-hold circuit 62 is supplied with the sampling pulse (C) shown in FIG. 5, sampling at write power and holding at read power, and supplies from the W pin to the adder circuits 64, 66, and at the same time is supplied with the sampling pulse (B) shown in FIG. 5, sampling at read power and holding at write power, and supplying from the R pin to the adder circuits 68, 70.

In so doing, the adder circuit 64 adds the detection signals of the photosensors 12B, 14B at write power and supplies a signal to the noninverted input pin of the subtracting circuit 72 and one of the input pins of an adding circuit 90, and the adder 66 adds the detection signals of the photosensors 12A, 14A at write power and supplies a signal to the noninverted input pin of the subtracting circuit 72 and to the other input pin of the adding circuit 90.

The adding circuit 68 adds the detection signal of the photosensors 12B, 14B at read power and supplies a signal to the inverted input pin of the subtracting circuit 74 and to one of the input pins of an adding circuit 92, and the adding circuit 70 adds the detection signals of the photosensors 12A, 14A at read power and supplies a signal to the inverted input pin of the subtracting circuit 74 and to the other of the input pins of the adding circuit 92.

Accordingly, the subtracting circuit 72 outputs a tracking error component obtained from the reflection from the sub light beam spots 3, 4 during a write power, the adding circuit 90 outputs the total sum of the outputs of the photosensors 12A, 12B, 14A and 14B during a write power, the subtracting circuit 74 outputs a tracking error component obtained from the reflection from the sub light beam spots 3, 4, during a read power and the adding circuit 92 outputs the total sum of the outputs of the photosensors 12A, 12B, 14A, 14B during a read power. A normalizing part 94 divides the output of the subtracting circuit 72 by the output of the adding circuit 90 to normalize the signal and supply it to the noninverted input pin of the subtracting circuit 78, and a normalizing part 96 divides the output of the subtracting circuit 74 by the output of the adding circuit 92 to normalize the signal and supply it to the inverted input pin of the subtracting circuit 78. The subtracting circuit 78 generates an amount by which the normalized write power and read power tracking error components differ, that is, a recording offset, and supplies that recording offset to the switch 80.

The switch 80 turns ON only during recording, and supplies the recording offset to the adder 82. The adder 82 adds the reproduction offset from the pin 84 to the error signal that the adding circuit 20 outputs during reproduction, and during recording further adds the recording offset from the switch 80, and outputs the result as a tracking error signal from pin 86. By controlling the tracking using the servo circuit 60 so that the tracking error signal becomes zero, the main light beam spot 2 follows the pregroove 1, that is, tracking is carried out.

In this fashion, each time recording is carried out a recording offset is sought, so that an accurate recording offset can be obtained even if changes in the laser diode characteristics due to temperature changes or the passage of time cause the amount by which the light beam axis is displaced during recording to shift with respect to that axis during reproduction. As a result, tracking error can be prevented and accurate tracking can be conducted.

It should be noted that the first and second embodiments described above use the respective detection signals from photosensors 12A, 12B, 14A, 14B that detect the reflection from the sub light beam spots 3, 4 to detect the recording offset, but simply put, it is possible to detect a recording offset using one or the other of the sub light beam spots 3, 4 detection signals.

Figure 8:
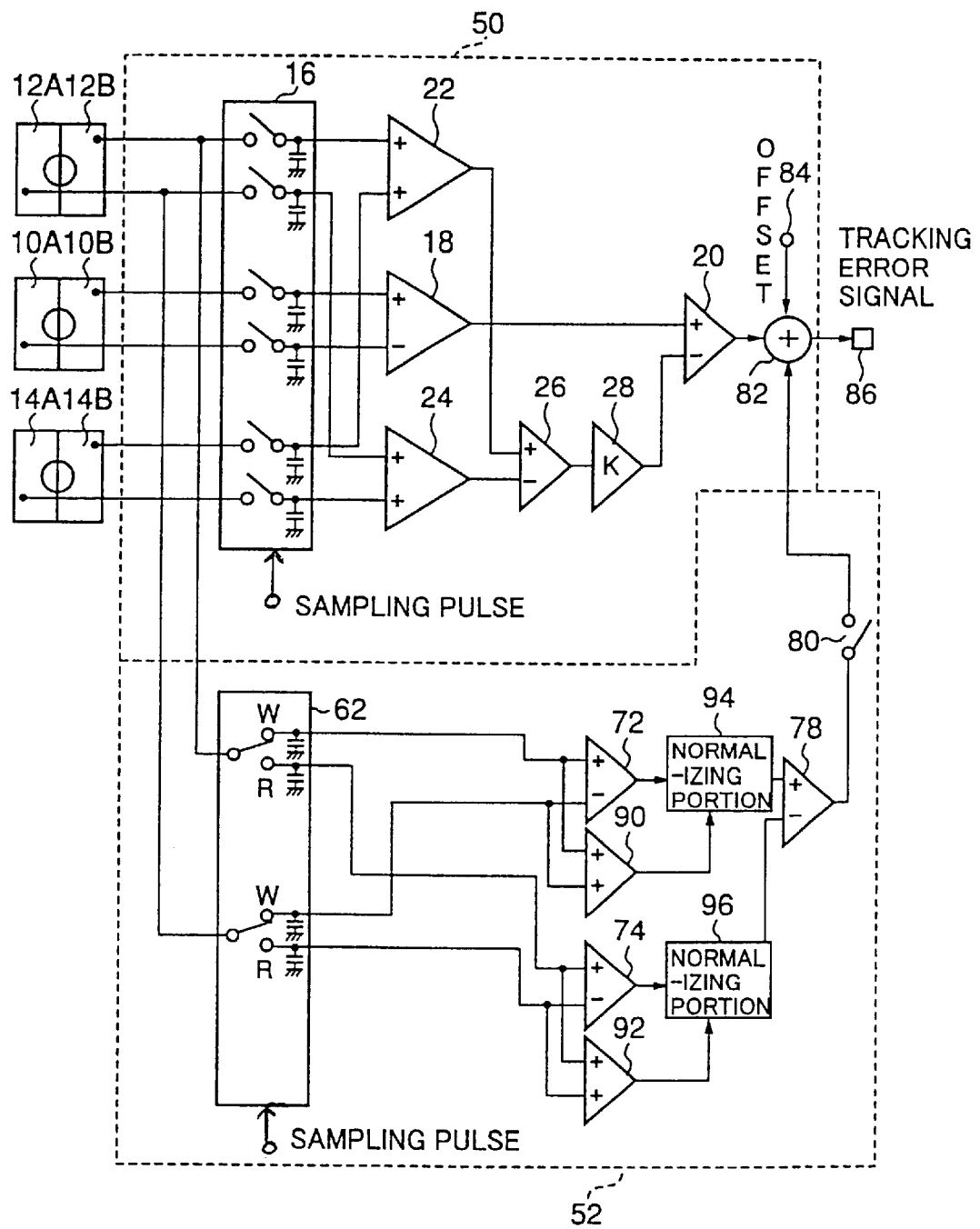
FIG. 8 is a circuit diagram of a tracking error signal generation circuit and an offset detection circuit of an optical disk unit according to a third embodiment of the present invention.

FIG. 8 is a circuit diagram of a tracking error signal generation circuit and an offset detection circuit of an optical disk unit according to a third embodiment of the present invention.

As shown in FIG. 8, the detection signals of the photosensors 12A, 12B are supplied to the sample-and-hold circuit 62 that forms the offset detection circuit 52. The sample-and-hold circuit 62 is supplied with the sampling pulse (C) as shown in FIG. 5, performs sampling at write power and hold at read power, and supplies the sampled-and-held signal to the subtracting circuit 72 and the adding circuit 90 from the W pin, and, at the same time, is supplied with the sampling pulse shown as (B) in FIG. 5, performs sampling at read power and hold at write power, and supplies the sampled-and-held signal to the subtracting circuit 74 and the adding circuit 92 from the R pin.

Accordingly, the subtracting circuit 72 outputs a tracking error component obtained from the reflection from the sub light beam spot 3 at write power, the adding circuit 90 outputs the sum of the outputs of the photosensors 12A, 12B at write power, the subtracting circuit 74 outputs a tracking error component obtained from the reflection from the sub light beam spot 3 at read power, and the adding circuit 92 outputs a sum of the outputs of the photosensors 12A, 12B at read power. The normalizing part 94 divides the subtracting circuit 72 output by the adding circuit 90 output and normalizes, and supplies the output to the noninverted input pin of the subtracting circuit 78, and the normalizing part 96 divides the subtracting circuit output 74 by the adding circuit 92 output, normalizes the output and supplies the output to the inverted input pin of the subtracting circuit 78. The subtracting circuit 78 generates an amount by which the normalized write power and read power tracking error components differ, that is, a recording offset, and supplies that recording offset to the switch 80.

The switch 80 turns ON only during recording, and supplies the recording offset to the adder 82. The adder 82 adds the reproduction offset from the pin 84 to the error signal that the adding circuit 20 outputs during reproduction, and during recording further adds the recording offset from the switch 80, and outputs the result as a tracking error signal from pin 86. By controlling the tracking using the servo circuit 60 so that the tracking error signal becomes zero, the main light beam spot 2 follows the pregroove 1, that is, tracking is carried out.

It is possible to detect the recording offset from the detection signal from the main light beam spot 2. This is because, during recording, even though the reflection from the main light beam spot 2 is not stable until recording begins and the pits are formed, once the pits are formed the reflection from the main Light beam spot 2 becomes stable.

Figure 9:
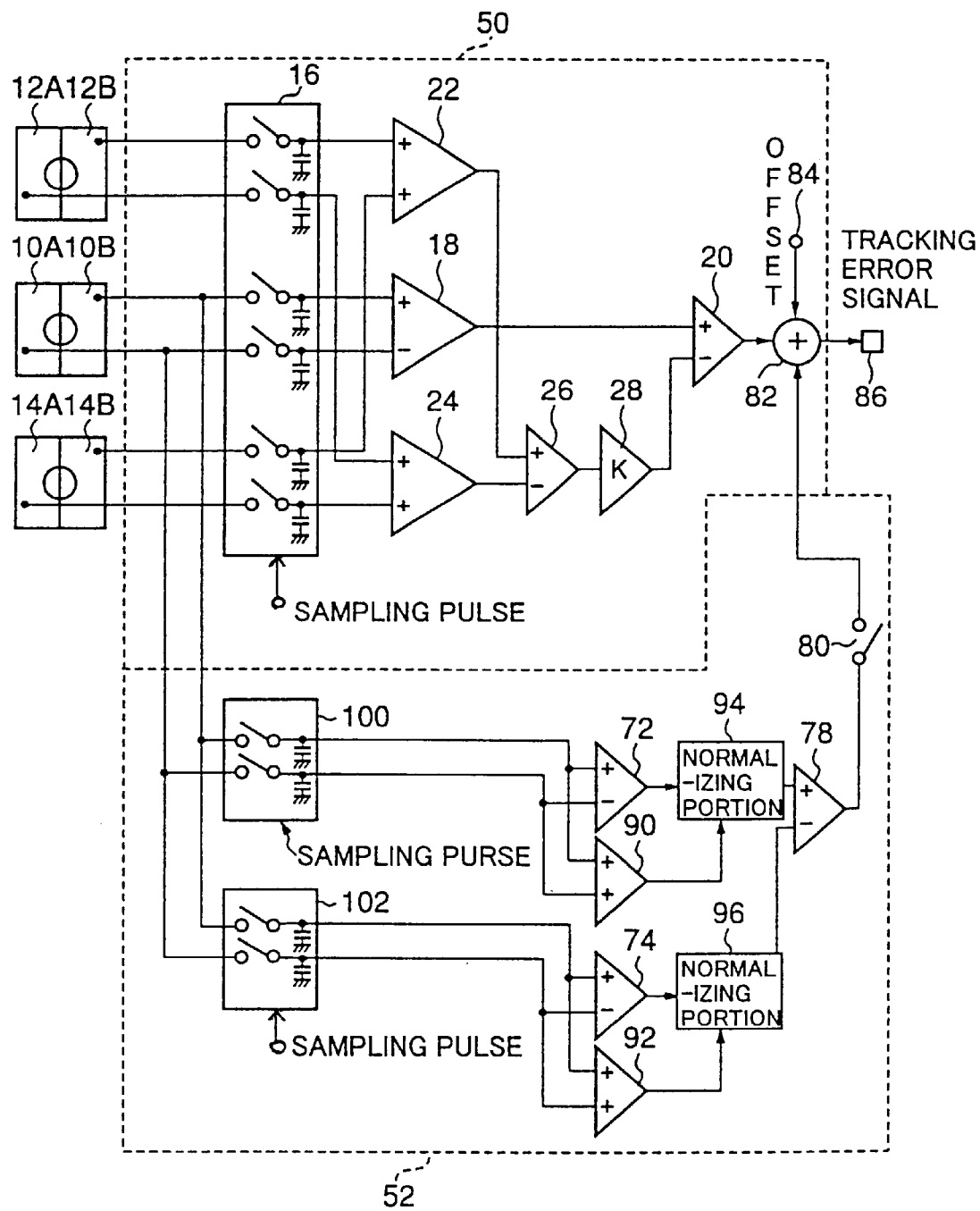
FIG. 9 is a circuit diagram of a tracking error signal generation circuit and an offset detection circuit of an optical disk unit according to a fourth embodiment of the present invention.

FIG. 9 is a circuit diagram of, a tracking error signal generation circuit and an offset detection circuit of an optical disk unit according to a fourth embodiment of the present invention.

In FIG. 9, the detection signals of the photosensors 10A, 10B are supplied to sample-and-hold circuits 100, 102 that form the offset detection circuit 52. The sample-and-hold circuit 100 is supplied with a delayed sampling pulse shown as (C) in FIG. 5, in which the start of the sampling pulse is delayed by a predetermined amount of time, and performs sampling at write power once recording using the main light beam spot 2 has commenced and the pits have been formed and holds during a low-level interval of the delayed sampling pulse, the interval including the read power interval. Then, the output signals of the photosensors 10A, 10B are converted into sampled-and-held signals and supplied to the subtracting circuit 72 and the adding circuit 90.

The sample-and-hold circuit 102 is supplied with the sampling pulse shown as (B) in FIG. 5, and performs sampling at read power and holds at write power, and supplies the detection signals of the photosensors 10A, 10B as sampled-and-held signals to the subtracting circuit 74 and the adding circuit 92.

Accordingly, the subtracting circuit 72 outputs a tracking error component obtained from the reflection from the main light beam spot 2 at write power after the formation of the pits, the adding circuit 90 outputs the sum of the detection signals of the photosensors 10A, 10B at write power after the formation of the pits, the subtracting circuit 74 outputs a tracking error component obtained from the reflection from the main light beam spot 2 at read power, and the adding circuit 92 outputs the sum of the detection signals of the photosensors 10A, 10B at read power. The normalizing part 94 divides the subtracting circuit 72 output by the adding circuit 90 output and supplies the normalized output to the noninverted input pin of the subtracting circuit 78, and the normalizing part 96 divides the subtracting circuit 74 output by the adding circuit 92 output and supplies the normalized output to the inverted input pin of the subtracting circuit 78. The subtracting circuit 78 generates an amount by which the normalized write power and read power tracking error components differ, that is, a recording offset, and supplies that recording offset to the switch 80.

The switch 80 is turned ON only during recording and supplies the recording offset to the adder 82. During reproduction, the adder 82 then adds the reproduction offset from the pin 84 to the error signal output by the adding circuit 20, and during recording the adder 82 further adds the recording offset from the switch 80, and outputs the sum as a tracking error signal from the pin 86. By adjusting the tracking control at the servo circuit 60 so that the tracking error signal approaches zero, the main beam spot 2 can track the pregroove 1.

Figure 10:
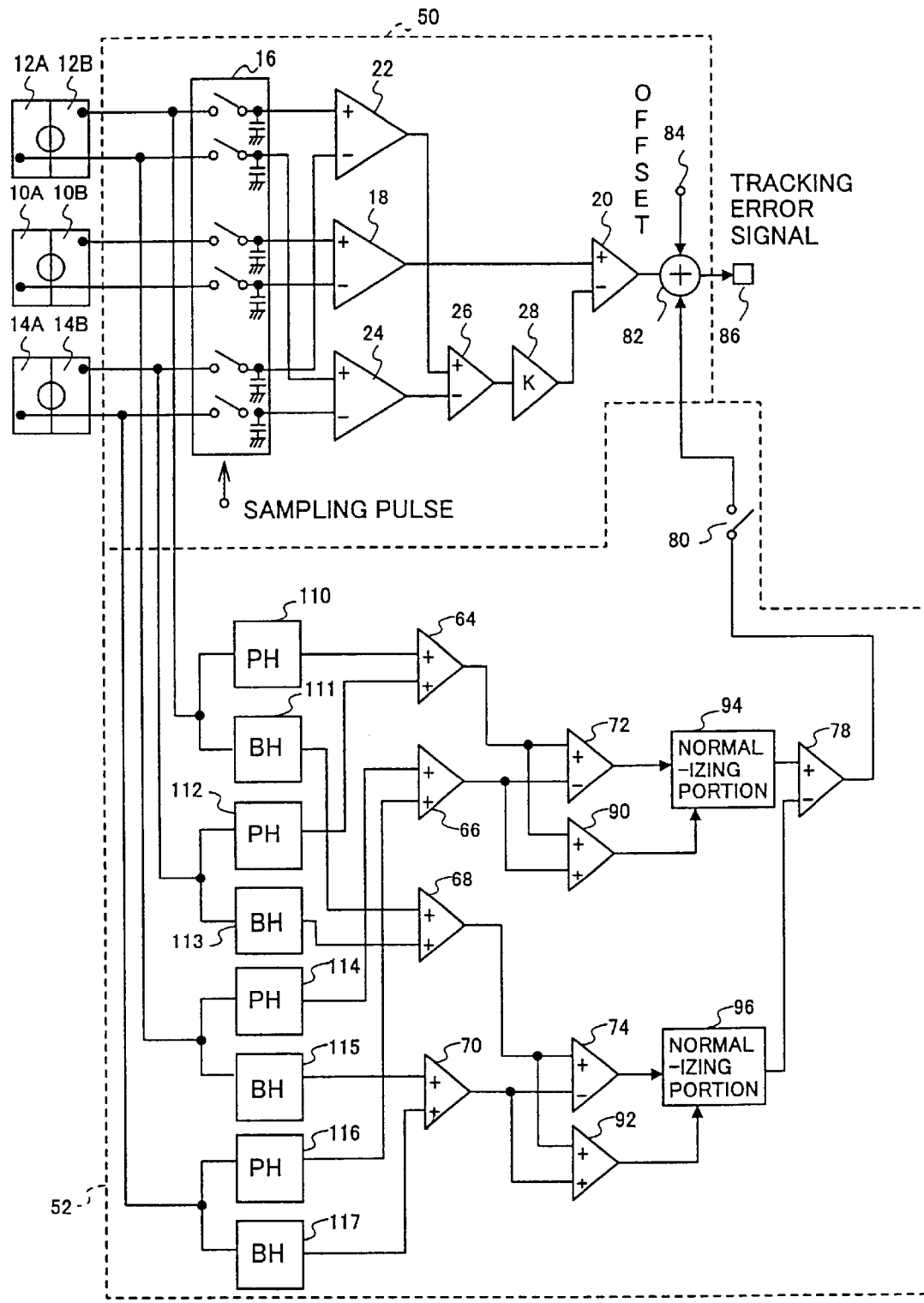
FIG. 10 is a circuit diagram of a tracking error signal generation circuit and an offset detection circuit of an optical disk unit according to a variation of the second embodiment of the present invention.

FIG. 10 is a circuit diagram of a tracking error signal generation circuit and an offset detection circuit, of an optical disk unit according to a variation of the second embodiment of the present invention.

As shown in FIG. 10, of the respective detection signals of the photosensors 12A, 12B, 14A, 14B that detect the reflection from the sub light beam spots 3, 4, the detection signal from the photosensor 12B is supplied to the peak hold circuit (PH) 110 and bottom hold circuit (BH) 111 that form the offset detection circuit 52, the detection signal from the photosensor 14B is supplied to the peak hold circuit 112 and the bottom hold circuit 113, the detection signal from the photosensor 12A is supplied to the peak hold circuit 114 and the bottom hold circuit 115, and the detection signal from the photosensor 14A is supplied to the peak hold circuit 116 and the bottom hold circuit 117.

The respective peak hold circuits 110, 112, 114 and 116 hold at write power peak level and supply the held level to the adding circuits 64, 66. The respective bottom hold circuits 111, 113, 115 and 117 hold the read power bottom level and supply the level to the adding circuits 68, 70.

Accordingly, the adding circuit 64 adds the detection signals from the photosensors 12B, 14B at write power and supplies the sum signal to the noninverted input pin of the subtracting circuit 72 and to one of the input pins of the adding circuit 90, and the adding circuit 66 adds the detection signals of the photosensors 12A, 14A at write power and supplies the sum signal to the inverted input pin of the subtracting circuit 72 and to the other input pin of the adding circuit 90.

Additionally, the adding circuit 68 adds the detection signal levels of the photosensors 12B, 14B at read power and supplies the sum signal to the noninverted input pin of the subtracting circuit 74 and to one of the inverted input pins of the adding circuit 92, and the adding circuit 70 adds the detection signal levels of the photosensors 12A, 14A at read power and supplies the sum signal to the inverted input pin of the subtracting circuit 74 and to the other input pin of the adding circuit 92.

Accordingly, the subtracting circuit 72 outputs a tracking error component obtained from, the reflection from the sub light beam spots 3, 4 at write power, the adding circuit 90 outputs the total sum of the outputs of the photosensors 12A, 12B, 14A, 14B at write power, the subtracting circuit 74 outputs a tracking error component obtained from the reflection from the sub light beam spots 3, 4 at read power, and the adding circuit 92 outputs the total sum of the outputs of the photosensors 12A, 12B, 14A, 14B at read power. The normalizing part 94 divides the subtracting circuit 72 output by the adding circuit 90 output, and supplies the normalized result to the noninverted input pin of the subtracting circuit 78, and the normalizing part 96 divides the subtracting circuit 74 output by the adding circuit 92, and supplies the normalized result to the inverted input pin of the subtracting circuit 78. The subtracting circuit 78 generates an amount by which the normalized write power and read power tracking error components differ, that is, a recording offset, and supplies that recording offset to the switch 80.

According to the above-described variation, the peak hold circuits 110, 112, 114 and 116 and the bottom hold circuits 111, 113, 115 and 117 are used instead of the sample-and-hold circuit 62. A sampling pulse generator circuit 56 is required in order to use the sample-and-hold circuit 62, thus increasing the size of the circuitry, so using the peak hold circuits 110, 112, 114 and 116 and the bottom hold circuits 111, 113, 115 and 117 instead allows the size of the circuitry to be reduced.

Figure 11:
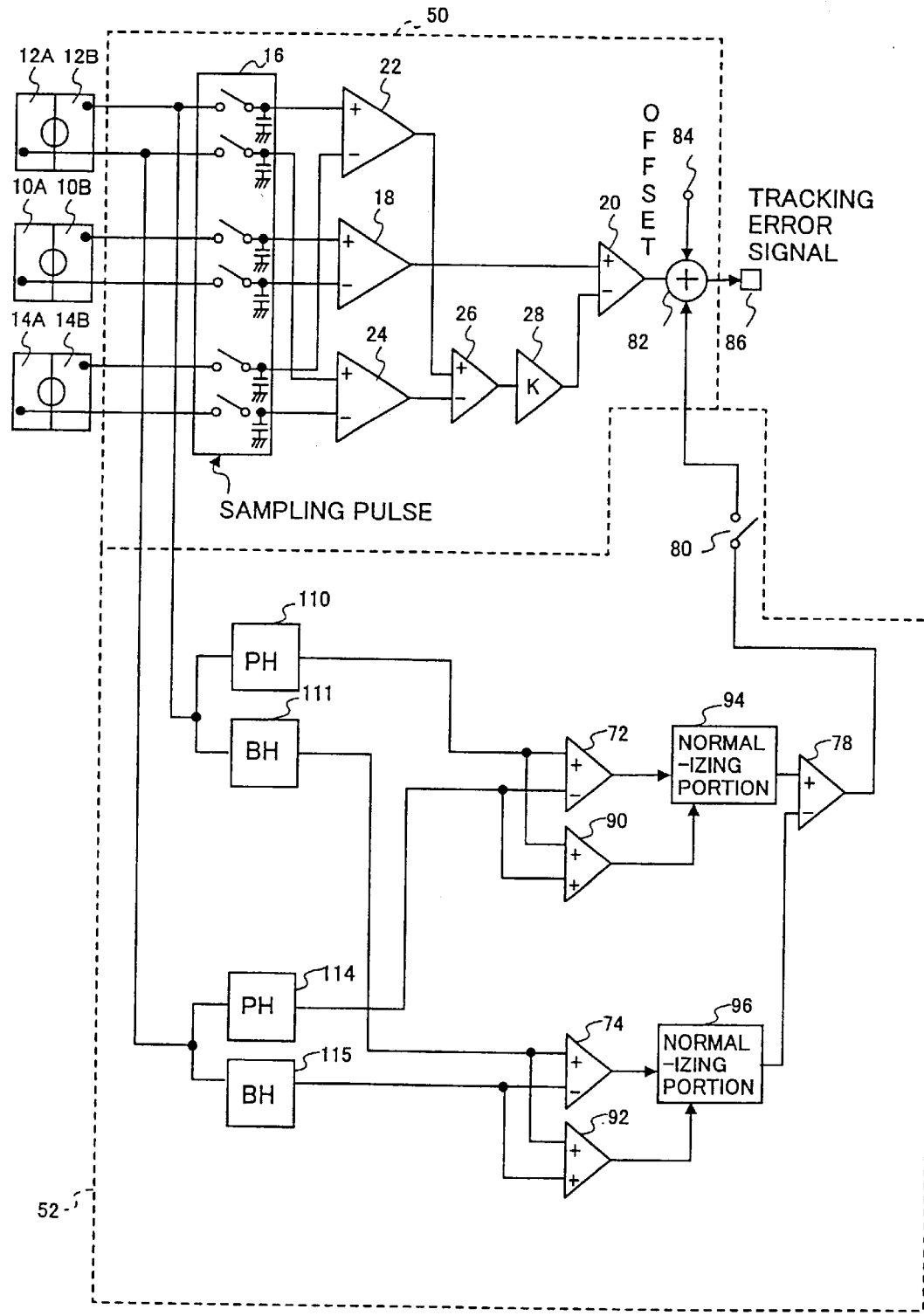
FIG. 11 is a circuit diagram of a tracking error signal generation circuit and an offset detection circuit of an optical disk unit according to a variation of the third embodiment of the present invention.

FIG. 11 is a circuit diagram of a tracking error signal generation circuit and an offset detection circuit of an optical disk unit according to a variation of the third embodiment of the present invention.

As shown in FIG. 11, the detection signal of the photosensor 12B is supplied to the peak hold circuit 110 and the bottom hold circuit 111 that form the offset detection circuit, and the detection signal of the photosensor 12A is supplied to the peak hold circuit 114 and the bottom hold circuit 115 that form the offset detection circuit. The peak hold circuits 110 and 114, respectively, hold at write power peak level and supply the held level to the subtracting circuit 72 and the adding circuit 90. The bottom hold circuits 111 and 115, respectively, hold at read power bottom level and supply the held level to the subtracting circuit 74 and the adding circuit 92.

Accordingly, the subtracting circuit 72 outputs a tracking error component obtained from the reflection from the sub light beam spot 3 at write power, the adding circuit 90 outputs the total sum of the outputs of the photosensors 12A, 12B at write power, the subtracting circuit 74 outputs a tracking error component obtained from the reflection from the sub beam light spot 3 at read power, and the adding circuit 92 outputs the total sum of the outputs of the photosensors 12A, 12B at read power. The normalizing part 94 divides the subtracting circuit 72 output by the adding circuit 90 output to normalize the output, which the normalizing part 94 then supplies to the noninverted input pin of the subtracting circuit 78, and the normalizing part 96 divides the subtracting circuit 74 output by the adding circuit 92 output to normalize the output, which the normalizing part than supplies to the inverted input pin of the subtracting circuit 78. The subtracting circuit 78 generates an amount by which the normalized write power and read power tracking error components differ, that is, a recording offset, and supplies that recording offset to the switch 80.

In the above-described variation as well, by using peak hold circuits 110, 114 and bottom hold circuits 111, 115 instead of the sample-and-hold circuit 62, the size of the circuitry can be reduced.

Figure 12:
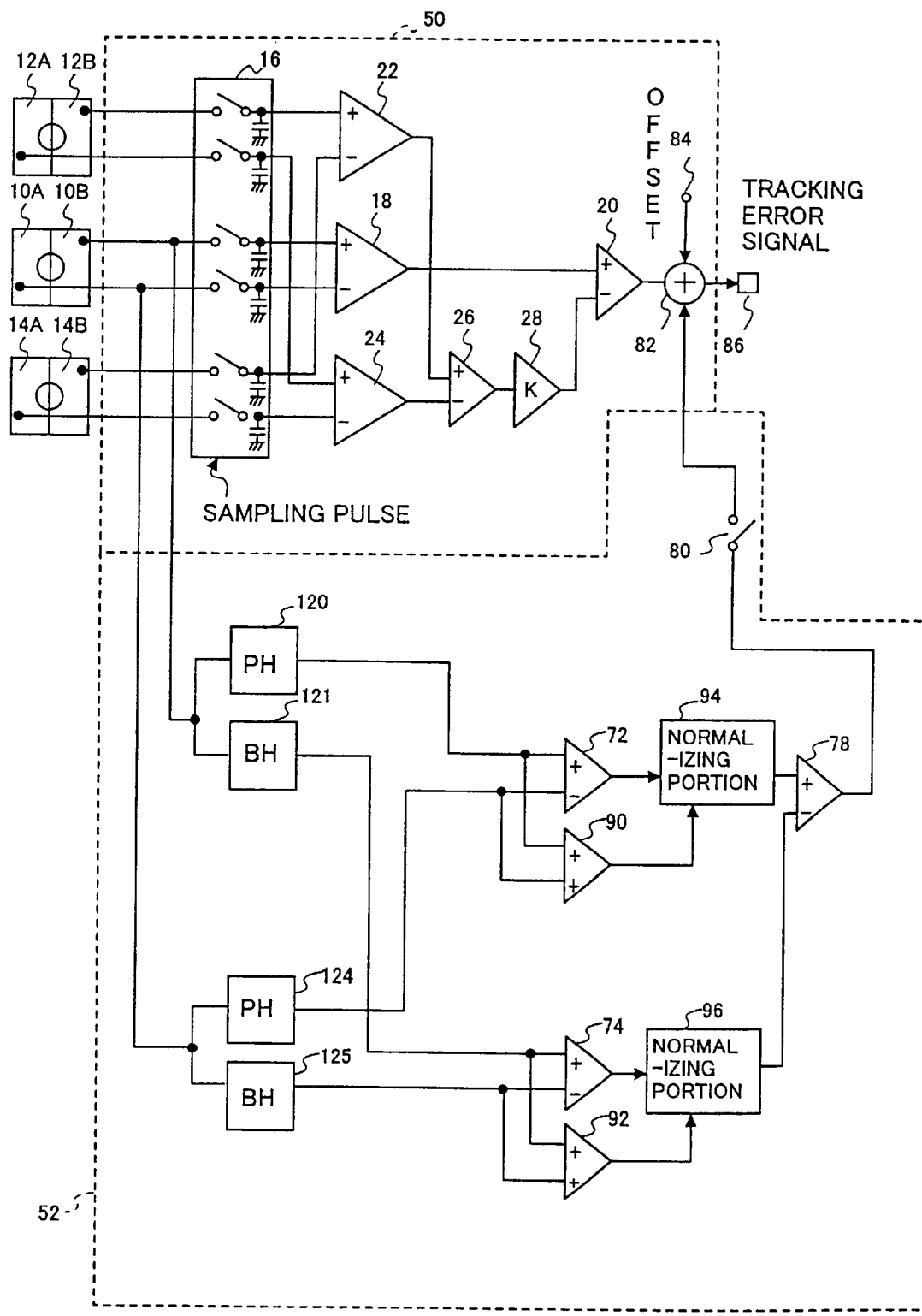
FIG. 12 is a circuit diagram of a tracking error signal generation circuit and an offset detection circuit of an optical disk unit according to a variation of the fourth embodiment of the present invention.

FIG. 12 is a circuit diagram of a tracking error signal generation circuit and an offset detection circuit of an optical disk unit according to a variation of the fourth embodiment of the present invention.

As shown in FIG. 12, the photosensor 10B detection signal is supplied to a peak hold circuit 120 and a bottom hold circuit 121 that together form the offset detection circuit 52, and the photosensor 10A detection signal is supplied to a peak hold circuit 124 and a bottom hold circuit 125. The time constant of the peak hold circuits 120, 124 is set so as to hold at a level at which the reflected light becomes constant. The peak hold circuits 120, 124 hold at a write power peak level after recording has commenced and pits formed by the main light beam spot 2, and supply the held level to the subtracting circuit 72 and the adding circuit 90. The bottom hold circuits 121, 125 each hold at a read power bottom level, and supply the held level to the subtracting circuit 74 and the adding circuit 92.

Accordingly, the subtracting circuit 72 outputs a tracking error component obtained from the reflection of the main light beam spot 2 after formation of the pits at write power, the adding circuit 90 outputs the total sum of the outputs from the photosensors 10A, 10B after formation of the pits at write power, the subtracting circuit 74 outputs a tracking error component obtained from the reflection of the main light beam spot 2 at read power, and the adding circuit 92 outputs the total sum of the outputs from the photosensors 10A, 10B at read power. The normalizing part 94 then divides the subtracting circuit 72 output by the adding circuit output 90 to normalize the output and supplies the normalized output to the noninverted input pin of the subtracting circuit 78. The normalizing part 96 then divides the subtracting circuit 74 output by the adding circuit output 92 to normalize the output and supplies the normalized output to the inverted input pin of the subtracting circuit 78. The subtracting circuit 78 generates an amount by which the normalized write power and read power tracking error components differ, that is, a recording offset, and supplies that recording offset to the switch 80.

In the above-described variation as well, by using the peak hold circuits 120, 124 and the bottom hold circuits 121, 125 instead of the sample-and-hold circuits 100, 102 the size of the circuitry can be reduced.

Figure 13:
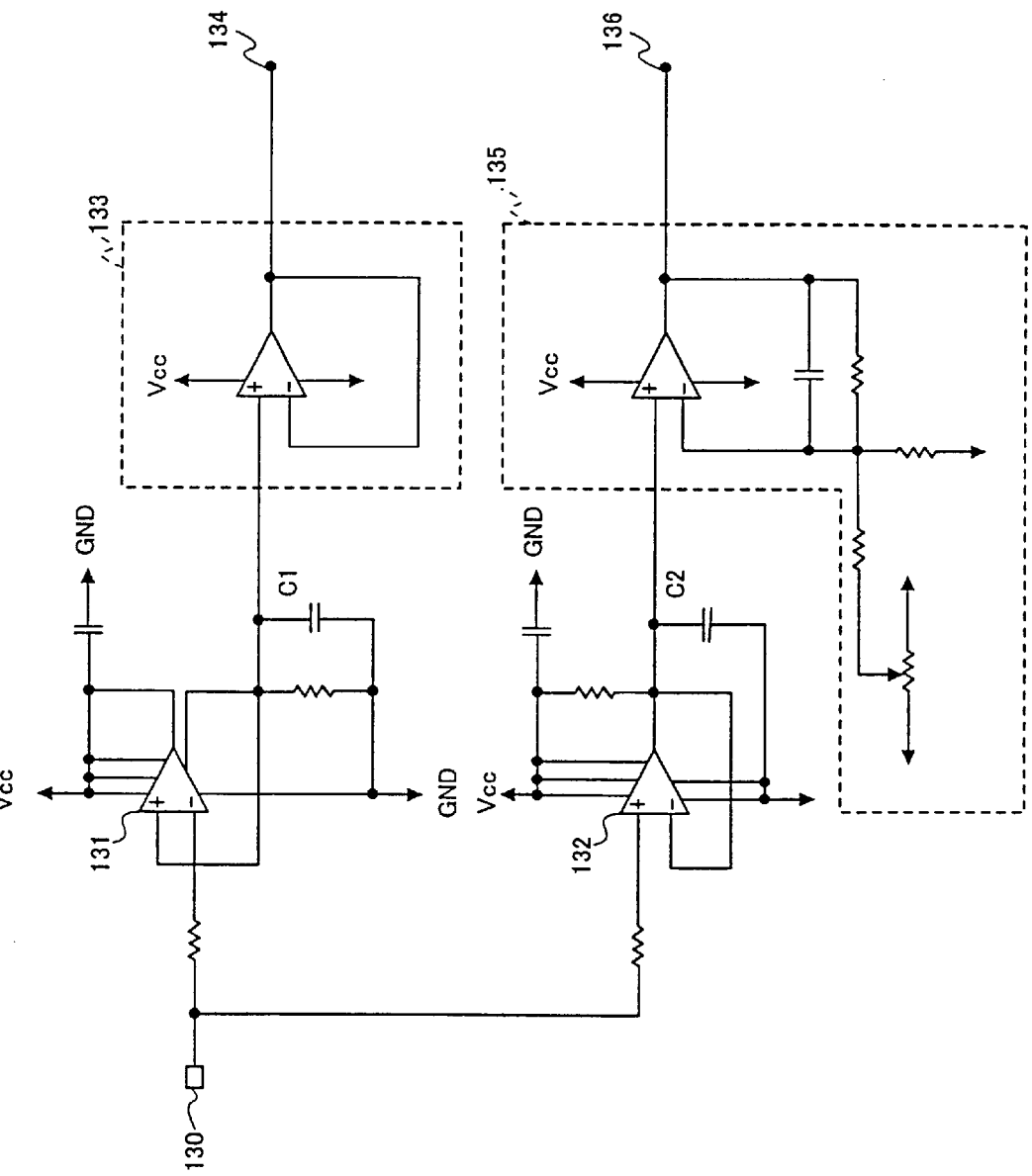
FIG. 13 is a circuit diagram of a peak hold circuit and a bottom hold circuit according to FIG. 14 is a circuit structure diagram of a normalizing part according to a first embodiment of the present invention.

FIG. 13 is a circuit diagram of a peak hold circuit and a bottom hold circuit,

It will be appreciated by those of skill in the art that the other peak hold circuits and bottom hold circuits of the present invention have a similar structure, and hence a detailed description thereof is omitted.

A detection signal from photosensor 12B is supplied to a pin 130, and then supplied to an inverted input pin of a comparator 131 and a noninverted input pin of a comparator 132.

The comparator 131 is disposed so that an output pin and a noninverted input pin are connected to one end of a capacitor C1, with the other end of the capacitor C1 grounded. The comparator 131 releases electrical current from the output pin and charges the capacitor C1 when the level at the inverted input pin of the comparator 131 is less than the level at the noninverted input pin of the comparator 131, and stops the flow of electrical current when the level at the inverted input pin equals or exceeds the level at the noninverted input pin. By so doing, the capacitor C1 holds the detection signal from the pin 130 at peak level. The peak level held at the capacitor C1 is passed through a buffer amplifier 133 and output from a pin 134.

The comparator 132 is disposed so that an output pin and an inverted input pin of the comparator 132 are connected to one end of a capacitor C2, with the other end of the capacitor C2 grounded. The comparator 132 takes in electrical current from the output pin and discharges the capacitor C2 when the level at the noninverted input pin of the comparator 132 equals or exceeds the level at the inverted input pin of the comparator 132, and stops the intake of electrical current when the level at the noninverted input pin is less than the level at the inverted input pin. By so doing, the capacitor C2 holds the detection signal from the pin 130 at bottom level. The bottom level held at the capacitor C2 is passed through a buffer amplifier 135 and output from a pin 136.

Figure 14:
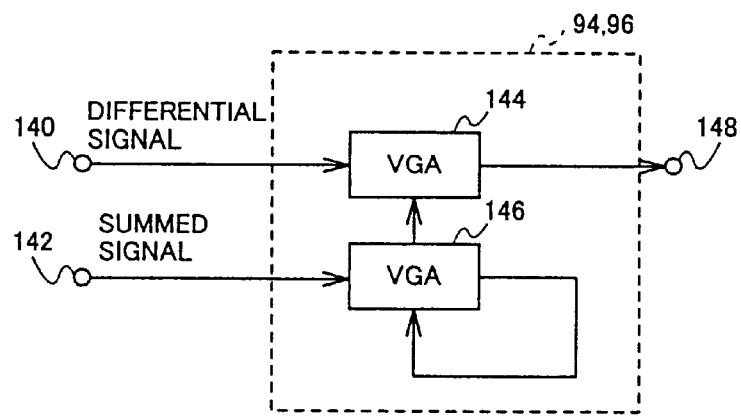

FIG. 14 is a circuit diagram of a normalizing part according to a first embodiment of the present invention. Although the following description pertains to normalizing part 94, it should be noted that normalizing part 96 is identical to normalizing part 94.

As shown in the diagram, the output from the subtracting circuit 72 is input to a pin 140 and supplied to a variable gain amplifier (VGA) 144. The output from the adding circuit 90 is input to pin 142 and supplied to a variable gain amplifier 146. The variable gain amplifier 146 adjusts the gain on the output signal level to a predetermined value such as, for example, 1 volt.

This variable gain amplifier 146 adjustment signal is supplied to the variable gain amplifier 144, with the gain on the variable gain amplifier 144 adjusted to match that of the variable gain amplifier 146. In so doing, the subtracting circuit 72 output normalized by the adding circuit 90 output is output from the pin 148 and supplied to the subtracting circuit 78.

Figure 15:
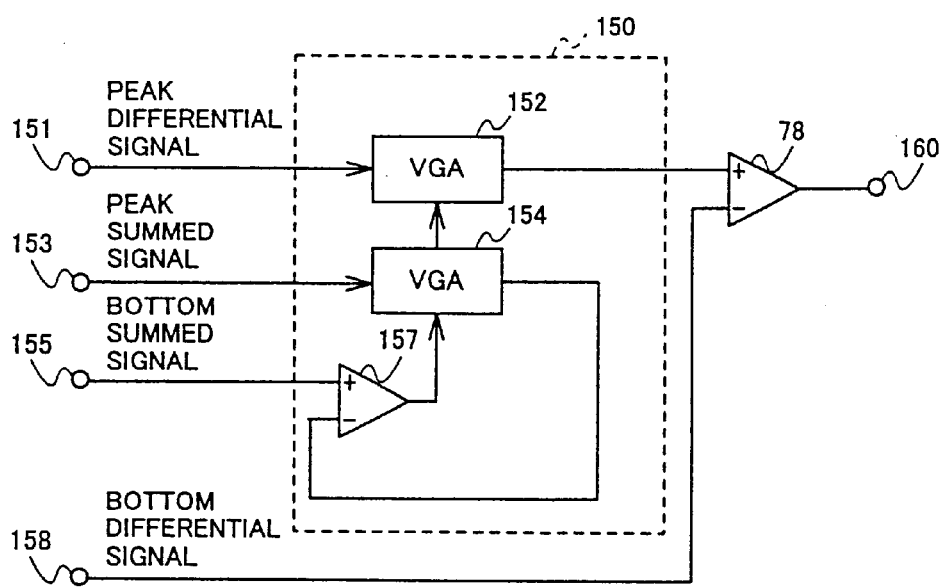
FIG. 15 is a circuit structure diagram of a normalizing part according to a second embodiment of the present invention.
Figure 16:
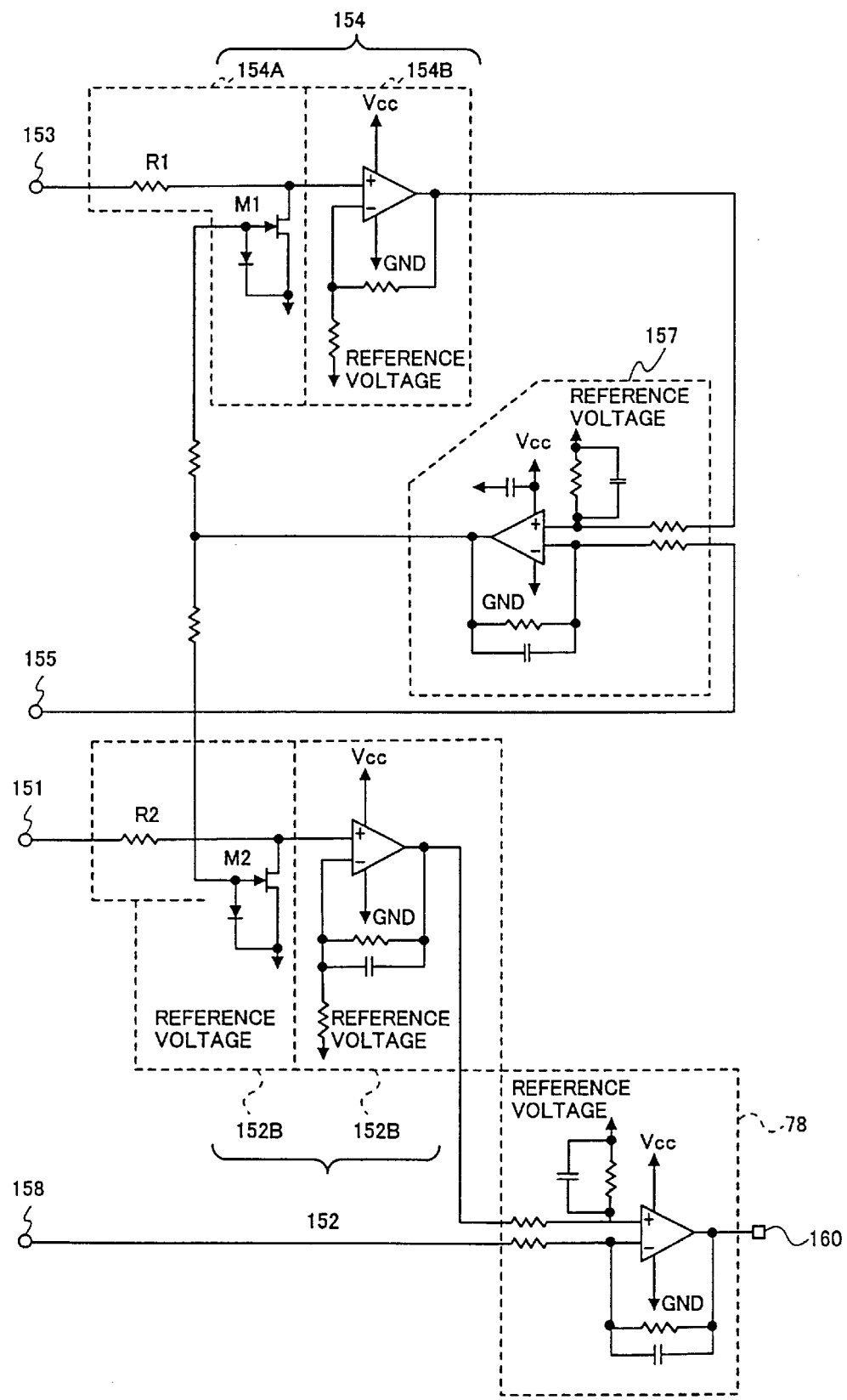
FIG. 16 is a circuit diagram of a normalizing part according to a second embodiment of the present invention.

FIG. 15 is a circuit structure diagram of a normalizing part according to a second embodiment of the present invention. FIG. 16 is a circuit diagram of a normalizing part according to a second embodiment of the present invention. More specifically, FIGS. 15 are 16 are circuit structure and circuit diagrams, respectively, of normalizing parts 94, 96 according to a second embodiment of the present invention. In this second embodiment, the normalizing parts 94, 96 are formed by a single normalizing part 150.

In FIGS. 15 and 16, the subtracting circuit 72 output (a peak differential signal) is input to a pin 151 and supplied to a variable gain amplifier 152, the adding circuit 90 output (a peak summed signal) is supplied to a pin 153 and supplied to a variable gain amplifier 154, the adding circuit 92 output (a bottom summed signal) is input to a pin 155 and supplied to the noninverted input pin of an operational amplifier 157, and the subtracting circuit 74 output (a bottom differential signal) is input to a pin 158 and supplied to the inverted input pin of the subtracting circuit 78.

As shown in FIG. 16, the variable gain amplifier 154 is composed of an attenuator portion 154A consisting of a depletion-type N-channel junction-gate Field Effect Transistor (FET) M1 whose ON resistance changes depending on the resistance R1 and the gate voltage, and a fixed gain amp lifting portion 154B. Similarly, the variable gain amplifier 152 is composed of an attenuator portion 152A consisting of a depletion-type N-channel junction-gate Field Effect Transistor FET M2 whose ON resistance changes depending on the resistance R1 and the gate voltage, and a fixed gain amplifying portion 152B. Paired FETs having the same characteristics and formed on top of the same chip are used for the FET M1 and FET M2.

The adding circuit 90 output passed through the variable gain amplifier 154 is supplied to the inverted input pin of the operational amplifier 157, where a differential signal with the adding circuit 92 output is generated and supplied to the gates of the junction-gate FET M2, M1 of the variable gain amplifiers 154, 152. In so doing, the variable gain amplifier 154 adjusts the gain on the adding circuit 90 output so that the adding circuit 90 output level is the same level as that of the adding circuit 92 output. The gain of the variable gain amplifier 152 is adjusted to be identical to that of the variable gain amplifier 154, so a normalized subtracting circuit 72 output signal is supplied from the variable gain amplifier 152 to the noninverted input pin of the subtracting circuit 78, where the subtracting circuit 74 output is subtracted.

It will be appreciated by those of skill in the art that the normalizing circuit can be simplified by using the configuration described above.

It should be noted that the offset detection circuit 52 corresponds to the recording offset generator described in the claims.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 11-312756, filed on Nov. 2, 1999, and Japanese Priority Application No. 2000-318395, filed on Oct. 18, 2000, the contents of which are hereby incorporated by reference.

What is claimed is:

1. An optical disk unit that directs a light beam onto a pregroove on an optical disk and generates a tracking error signal for tracking control based on a detection signal generated from a reflection of the light beam, the optical disk unit comprising a recording offset generator that acquires a differential between a tracking error component generated, during recording, from a detection signal from the reflection of the light beam at a write power level and a tracking error component generated, during recording, from a detection signal from the reflection of the light beam at a read power level or an erase power level and adds the differential to the tracking error signal at recording.

2. The optical disk unit as claimed in claim 1, wherein the recording offset generator adjust the gain of the write power tracking error component and a read power tracking error component so as to combine the write power and the read power.

3. The optical disk unit as claimed in claim 1, wherein the recording offset generator normalizes the write power tracking error component and a read power tracking error component.

4. The optical disk unit as claimed in claim 3, wherein the recording offset generator takes a differential signal of the output signals of the photosensor separated along the direction of the width of the pregroove as the tracking error component, divides the differential signal by a sum signal that is a sum of the output signals of the separate photosensors, and normalizes the write power tracking error component and the read power tracking error component.

5. The optical disk unit as claimed in claim 3, wherein the recording offset generator takes a differential signal of an output signal of the photosensor separated into two along the direction of the width of the pregroove as the tracking error component, adjusts the gain so that the sum of the output signals of the two separate photosensors achieves a constant value and at the same time identically adjusts the gain of the differential signal, and normalizes each of the write power tracking error component and the read power tracking error component.

6. The optical disk unit as claimed in claim 1, wherein the recording offset generator takes a differential signal of the output signals of the photosensors separated along the direction of the width of the pregroove as the tracking error component, adjusts the gain so that a sum signal of the detection signals of the two separate photosensors at write power and a sum signal of the detection signals of the two separate photosensors at read power are the same value, and at the same time performs the same gain adjustment with respect to the write power differential signal.

7. The optical disk unit as claimed in claim 1, wherein the recording offset generator obtains a write power tracking error component and a read power tracking error component using a sample-and-hold circuit.

8. The optical disk unit as claimed in claim 1, wherein the recording offset generator obtains a write power tracking error component using a peak hold circuit and a read power tracking error component using a bottom hold circuit.

9. An optical disk unit that directs a main recording and reproduction light beam onto a pregroove of an optical disk and a directs a tracking sub light beam displaced in a direction of a width of the pregroove, and generates a tracking error signal based on a detection signal generated from a reflection of the light beam for tracking purposes, the optical disk unit comprising a recording offset generator that acquires a differential between a tracking error component generated, during recording, from a detection signal from the reflection of the sub light beam at a write power level and a tracking error component generated, during recording, from a detection signal from the reflection of the sub light beam at a read power level or an erase power level and adds the differential to the tracking error signal at recording.

* * * * *